United States Patent [19]

Elton et al.

[11] 4,239,589

[45] Dec. 16, 1980

[54] PROCESS FOR OXIDATION OF BLACK LIQUOR

[75] Inventors: Edward F. Elton, Bethlehem; Andrew J. Patrylak, Wescosville; Joseph G. Santangelo, Allentown, all of Pa.

[73] Assignee: Air Products and Chemicals, Inc., Allentown, Pa.

[21] Appl. No.: 947,802

[22] Filed: Oct. 2, 1978

[51] Int. Cl.³ .................. D21C 11/10; D21C 11/14
[52] U.S. Cl. ............................ 162/31; 159/47 WL; 162/47; 162/51; 210/758; 423/206 R; 423/DIG. 3
[58] Field of Search ............. 162/29, 30 R, 30 K, 162/31, 47, 51; 210/63 R; 159/47 WL; 423/206 R, 207, DIG. 3; 422/5

[56] References Cited

U.S. PATENT DOCUMENTS

| | | | |
|---|---|---|---|
| 3,178,260 | 4/1965 | Tirado | 423/DIG. 3 |
| 3,362,868 | 1/1968 | Backlund | 162/30 |
| 3,414,038 | 12/1968 | Laakso | 162/47 |
| 3,549,314 | 12/1970 | Shal | 162/30 |
| 3,650,889 | 3/1972 | Fogman et al. | 162/30 R |
| 3,709,975 | 1/1973 | Amsden et al. | 423/206 |
| 3,928,531 | 12/1975 | Boatwright et al. | 423/206 |
| 4,058,433 | 11/1977 | Fuller et al. | 162/16 |

FOREIGN PATENT DOCUMENTS

1353909 5/1974 United Kingdom .................. 210/63 R

OTHER PUBLICATIONS

Cooper et al., "Black Liquor Oxidation ... Reaction", Tappi 56, No. 6, Jun. 1973.
Grace, Forum on Kraft Recovery Alternatives, Inst. of Paper Chem., 1976.
Bart et al., Forum on Kraft Recovery Alternative, Inst. of Paper Chem., 1976.
Christie, "Sulfide Increase Following Weak Black Liquor Oxidation ...", P & P Mag. Cam., 73, No. 10, Oct. 1972.

Primary Examiner—Peter F. Kratz
Attorney, Agent, or Firm—James C. Simmons; E. Eugene Innis

[57] ABSTRACT

High recovery of useful energy from the heat of reaction in the oxidation of black liquor is obtained by integrating the oxidation into the multiple effect evaporation system of the pulp mill recovery sequence. The heat of reaction is thereby recovered as flash steam, which when combined with the vapors from an appropriate evaporator body enables recovery of its energy through further evaporation. The oxidation reaction may be carried out on the liquor leaving the second effect of the evaporation sequence for maximum energy recovery, or in accordance with an alternative embodiment, the reaction is carried out between the first effect and the flash tank with preferable addition of a second flash tank in series with the first.

13 Claims, 6 Drawing Figures

PROCESS FOR OXIDATION OF BLACK LIQUOR

BACKGROUND OF THE INVENTION

1. Field of the Invention

The present invention relates to the oxidation of sulfur and compounds thereof contained in black liquor as practiced in pulp mills for recovery of sulfur values and the elimination of malodorous emissions and is particularly concerned with a unique system for recovery of high value energy from the heat evolved in such oxidation reaction, which heat would otherwise be dissipated.

2. Prior Art

The oxidation of black liquor is currently being employed in the pulping industry and has been described in numerous publications.

In a typical sequence of operation for cellulosic fiber liberation, as in the manufacture of paper products by the kraft pulping process, the raw wood chips or pieces are cooked or digested in a solution of one or more sulfur compounds. Thereafter the mixture of delignified fibers and treating liquid is sent to a blow tank for pressure reduction, and next transferred to a multiple stage washing facility in which the fibers are separated from the spent chemical-laden wash water filtrate, which filtrate is designated as "weak black liquor". In certain typical plants this black liquor is next subject to concentration in a multiple effect evaporation facility.

Since the spent treating liquid from the digester contains sodium sulfide and other sulfur compounds which are of themselves malodorous or which form hydrogen sulfide and/or other malodorous sulfur compounds released to the atmosphere during the pulp mill operation, it has become the pevailing practice to subject the sulfur-laden spent digestion liquid to oxidation at some selected stage in the sequence, to convert the sulfide and/or other sulfur compounds therein to more stable compounds such as thiosulfates and/or sulfates.

The point in the mill operation sequence at which the oxidation of this so-called "black liquor" is to be best carried out as well as the manner of carrying out the oxidation step, has been the subject of extensive investigation. Thus, among the various proposals advanced, it has been suggested by some proponents that the oxidation step be applied to the weak black liquor from the washing step and prior to concentration. Drawbacks encountered in this procedure led some mills to resort to previous concentration of the liquor and to subject the obtained "strong black liquor" to the oxidation step. Subsequently, it has been proposed, for example in accordance with U.S. Pat. No. 4,058,433, that oxidation be carried out in the weak black liquor preferably at a point between the outlet of the blow tank and the inlet of the pulp washers, preferably employing oxygen in high concentration as opposed to the more usual use of air for the purpose.

Various types of oxidizing reactions have heretofore been used or proposed for use in the oxidation of black liquor. In U.S. Pat. No. 4,058,433, above-referred to, a long narrow counter-flow reactor column is advocated. Other types of oxidizing vessels and arrangements are depicted in U.S. Pat. Nos. 3,362,868; 3,549,314; 3,709,975; and 3,928,531. In accordance with the disclosure in U.S. Pat. No. 3,709,975 certain of the objections and drawbacks of prior black liquor oxidation processes are stated to be avoided by resort to a multi-stage oxidation technique employing oxygen-rich gas, stated to be applicable to both weak and strong black liquor.

Systems and conditions for black liquor oxidation with molecular oxygen are described by Cooper et al in TAPPI 56, No. 6, June 1973 at pages 100 to 103 and in AIChE Symposium Series, Vol. 69, No. 133 at pp 106–115.

In none of the described techniques of the above-cited patents or other known prior art disclosures and practices of the pulp industry, is there found any description of a black liquor oxidation process particularly aimed at maximizing recovery of energy released in the oxidation reaction. Typically in conventional kraft mill recovery systems which employ air or oxygen black liquor oxidation (BLOX) only a fraction (about 20%) of the heat evolved in the oxidation reaction is recovered as high value energy. The remainder is either lost as vented water vapor or recovered as low value heat in the condenser cooling water.

SUMMARY OF THE INVENTION

In accordance with the process of the present invention most of the heat evolved in the oxidation of black liquor (as up to or approaching 100%) is recovered as high value energy. This desired objective is accomplished by the unique process sequences of the present invention wherein the BLOX reaction is integrated into the multiple effect evaporator system wherein the heat of reaction is recovered as flash steam. The obtained flash steam is combined with the vapors from an appropriate evaporator body to recover its energy through further evaporation. The BLOX reactor can be located such that flashed vapors are combined with vapors leaving an evaporation effect located upstream of the oxidation stage in the direction of black liquor flow, said evaporation effect being operated at higher pressure than that of the effect into which the black liquor is first introduced. Maximum energy recovery is attained when the oxidation reaction is applied to the liquor leaving the second effect of evaporation. When this oxidized liquor is then added to the first effect in the evaporation sequence, the heat of reaction is recovered by a reduction in evaporator steam demand.

In accordance with an alternative embodiment, the oxidation of the black liquor may be carried out between the first effect and the flash tank. In carrying out this alternative, maximum energy recovery is achieved by addition of a second flash tank in series with the first. In this manner, the flash steam from the first tank receiving the oxidized liquid is added to the vapors leaving the first evaporator effect and the flash steam from the second tank is used to supplement the vapors from the second evaporator effect. While operation with a single flash tank is also possible, such operation obtains reduced energy recovery.

In the foregoing summary reference is made to "first effect", "second effect", etc. of a multiple effect evaporator system. It will be understood the numbering sequence employed is in the direction of steam flow as is conventional in this art. Thus, in a reverse flow multiple effect evaporator system the initial dilute liquid to be subjected to concentration enters the evaporation system at the highest numbered effect while the steam is supplied at the opposed end of the sequence to the "first effect", so that in a six effect system the initial dilute liquid flow is increasingly concentrated as it flows from effect #6 to effect #1.

DETAILED DESCRIPTION

For a fuller appreciation of the advantages afforded by the present invention, it is instructive to examine the overall energy and material balances applicable.

In kraft pulp mill recovery processes, black liquor is concentrated to about 65% solids before it is fed to the recovery boiler for recovery of inorganic chemicals. Two methods of concentration are in general use.

1. Concentration to 50% solids in multiple effect evaporators followed by further concentration to 65% using indirect contact (forced circulation) evaporators.

2. Concentration to 50% solids in multiple effect evaporators followed by direct contact evaporation in which the liquor is contacted with recovery boiler flue gas to achieve a 65% solids concentration.

When direct contact evaporation is used, black liquor oxidation (BLOX) is required to prevent $H_2S$ formation which is caused by reaction between sodium sulfide and carbon dioxide in the flue gas.

$$Na_2S + CO_2 + H_2O \rightarrow Na_2CO_3 + H_2S$$

BLOX prevents this reaction by converting the sodium sulfide to sodium thiosulfate.

BLOX is exothermic having a heat of reaction of about $-2780$ BTU/lb $Na_2S$ when adjusted for some organic reaction[1]. As a result, the caloric value of the black liquor is reduced significantly resulting in a loss in steam production in the recovery boiler. In the existing art, only a fraction of this heat of reaction is recovered.

[1] Grace, T. M. in Forum on Kraft Recovery Alternatives, The Institute of Paper Chemistry, Appelton Wisc. 1976, p. 253.

Figure 1:
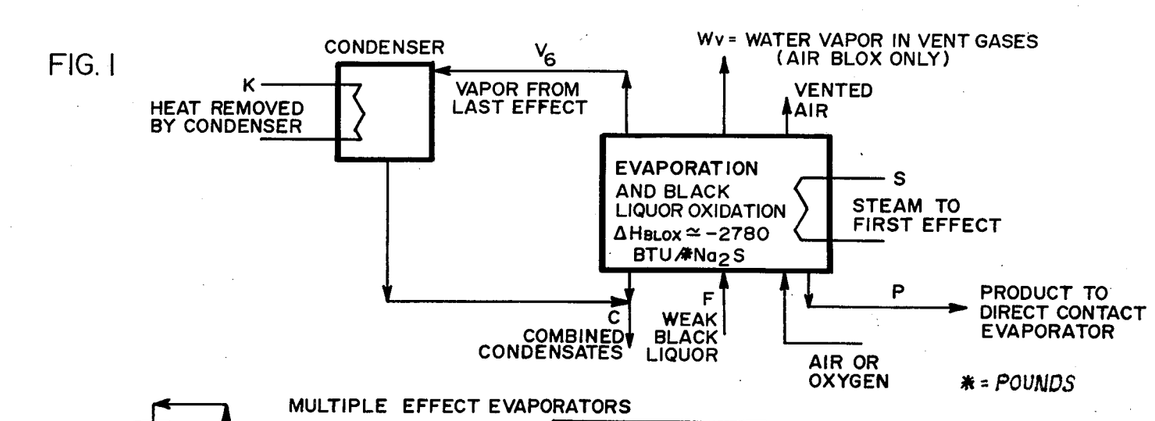
FIG. 1 is a block diagram of the major energy and material flows in a system for oxidation of a weak black liquor feed.

In FIG. 1 of the accompanying drawings, the following legends are employed:

F is the weight amount of weak black liquor;
C is the weight of the combined condensates;
P is the weight amount of oxidized liquid product leaving the multiple effect evaporation system;
W is weight amount of water vapor contained in the vented gas;
$V_6$ is the weight amount of vapor from evaporation effect (#6) sent to condensation.
S is the weight amount of steam supplied to the first effect of the multiple effect evaporator system.
K is the heat removed by condensation. When the weight unit is pounds, K is expressed in BTU/lb.

In the energy and material balances shown below, the energy content of the air and or oxygen streams have been neglected as well as the effect of reacted oxygen on the mass of product. Since the balances are to be used to compare systems giving identical product, these corrections are small.

By material balance, neglecting reaction oxygen $$F = W + P + C \tag{1}$$

and energy balance gives $$FH_f + SL_s = \Delta H + WH_W + PH_p + K + CH_c \tag{2}$$

and, $$K = V_6 L_6 \tag{3}$$

where

L = Latent heat of vaporization at condenser pressure,
H = enthalpy in BTU/lb and
$\Delta H$ = heat of reaction. The subscripts refer to the streams as indicated in FIG. 1.

Combining and solving for $SL_s$ gives $$SL_s = \Delta H + P(H_p - H_c) + F(H_c - H_f) + W(H_W - H_c) + V_6 L_6. \tag{4}$$

For practical reasons, there is an upper limit to the solids concentration of the feed to the direct contact evaporator[2]. Thus BLOX systems should be compared at identical feed and product compositions. The important differences, therefore, are the quantity of vapor evaporated in the 6th effect and the water vapor in the vent gas.

[2] Bart, R. et al, in Forum on Kraft Recovery Alternatives. The Institute of Paper Chemistry, 1976, p. 69.

For Air BLOX system, the term $W(H_W - H_c)$ represents a significant energy loss which is not recoverable as high value energy.

For oxygen BLOX systems, there is little or no venting of water vapor and thus the influence of BLOX on evaporator operating characteristics determines how efficiently the heat of reaction can be utilized.

Systems Without BLOX

Systems having direct contact evaporation but not using BLOX form a useful basis for comparison of the performance of various BLOX systems.

To simplify the analysis, evaporator performance for mills without BLOX will be approximated by $$F - P = E_n S$$

where $E_n$ is called the steam economy and is typically about 5 for kraft pulp mill evaporators under normal conditions. Thus, steam demand is $$S = \frac{F - P}{E_n}$$

for mills without BLOX

Figure 2:
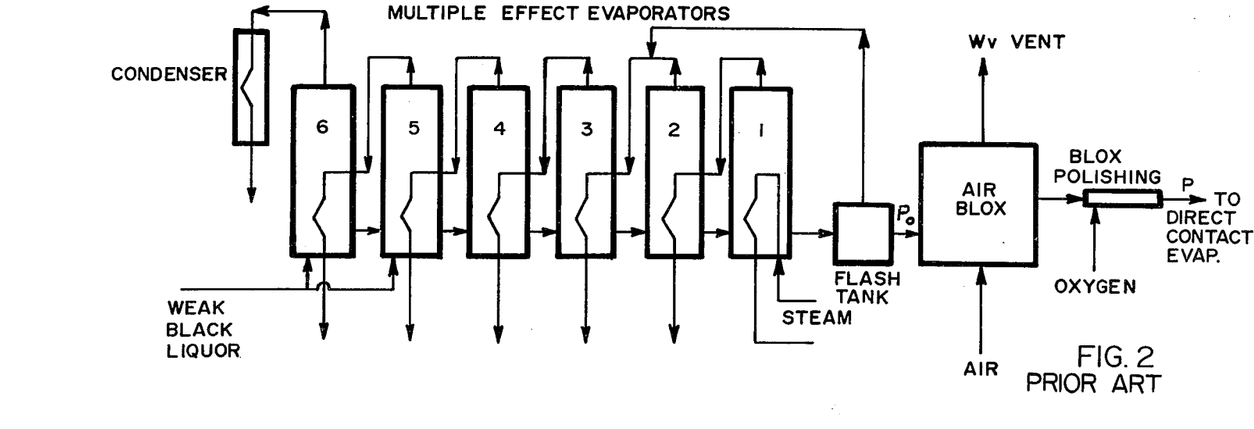
FIG. 2 is a schematic flow diagram of a typical strong black liquor oxidation system using air.

FIG. 2 depicts a typical strong black liquor oxidation system using air. The multiple effect evaporators are numbered 1 to 6. The weak black liquor, as shown, is simultaneously charged to the evaporated effects #6 and #5 and therefrom serially in descending number sequence into and through the other evaporator effects of the series discharging from evaporator effect #1 into a flash tank. Evaporator effect #1 is heated by a steam coil and the vapor products discharged overhead from evaporator effect #1 flow in indirect heat exchange with the liquid in evaporator effect #2, and in turn the vapor overhead from each of effects numbered #2 to #5 is employed in heating the next higher numbered evaporator effect in ascending numerical sequence. The vapor overhead from evaporator effect #6 is sent to a condenser. The vapor product flashed off in the flash tank is sent to join the vapor overhead discharged from evaporator effect #2 and passes into evaporator #3 in indirect heat exchange with the liquid therein.

The liquid residue from the flash tank ($P_o$) enters the oxidation reactor, where it is oxidized by contact with a flowing stream of air. The water vapors are vented from the oxidation reactor and, in some cases, the liquid is discharged into a BLOX polishing reactor for further contact with oxygen, the resulting "polished" liquid (P) being then sent to the direct contact evaporator.

Material and energy balances over the BLOX reactor in an arrangement such as that depicted in FIG. 2, are shown below:

$$P_o = P + \frac{(-\Delta H)}{L_w}$$

and, if the oxidation reactor is operated at equal inlet and outlet temperatures as recommended by Christie[3],

[3] Christie, R. D., Sulfide Increase Following Weak Black Liquor Oxidation, P&P Magazine, Can. 73, No. 10, October 1972, pp 74–78.

$$W_v = \frac{(-\Delta H)}{L_w}$$

for the evaporators it can be shown that $$V_6 L_6 = F(\frac{L_s}{E_n} + H_f - H_c) - P_o(\frac{L_s}{E_n} + H_{po} - H_c)$$

Noting that $(H_w - H_c) \cong L_w$ and substitution into equation 4 gives $$S \cong \frac{F - P}{E_n} - \frac{(-\Delta H)}{L_w}(\frac{1}{E_n} + \frac{H_p - H_c}{L_s})$$

$$\frac{H_p - H_c}{L_s}$$

therefore $$S \cong \frac{F - P}{E_n} - \frac{1}{E_n}\frac{(-\Delta H)}{L_w}$$

for air BLOX systems.

Figure 3:
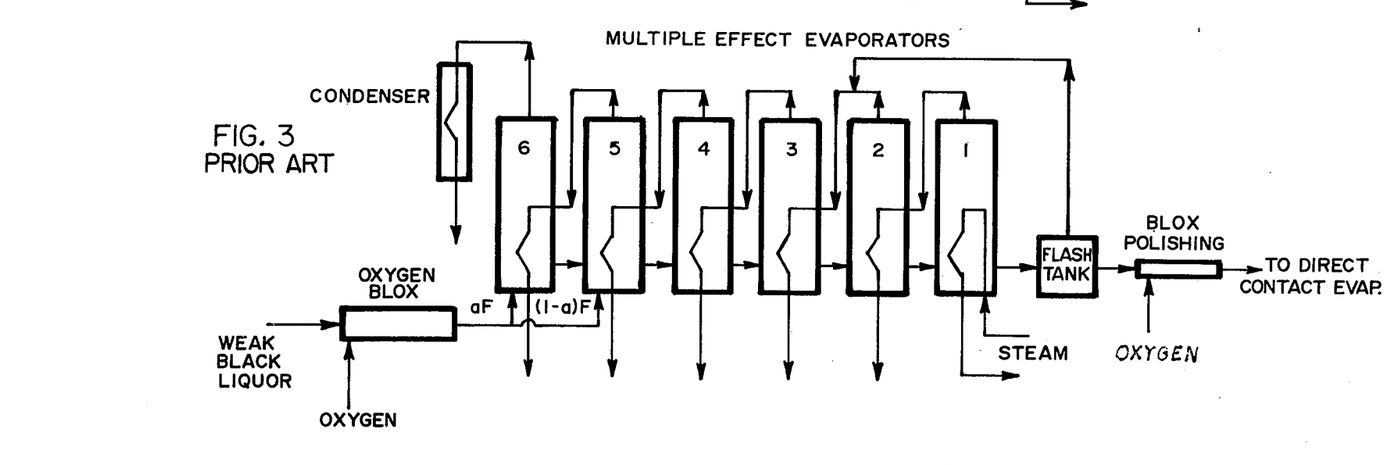
FIG. 3 is a schematic flow diagram of a typical weak black liquor oxidation system using oxygen.

In the typical system depicted in FIG. 3, oxidation of the weak black liquor is carried out before the liquor enters the multiple effect evaporator, using high concentration oxygen gas instead of normal air. The arrangement of the evaporator effects and flow patterns of liquid and vapor are otherwise the same as in the FIG. 2 scheme. Since the enthalpy of the evaporator feed liquor is higher than normal due to the heat of the reaction, the steam demand of the evaporators is reduced by an amount which compensates for the water removed as a result of flashing of the reaction heat in effects 5 and 6. Detailed multiple effect calculations are required for precise calculation of the steam demand; however, the following analysis is a reasonable approximation.

The evaporator feed is distributed between effects 5 and 6 as follows:

Feed to effect #6 = aF
Feed to effect #5 = (1 − a) F
Total water removed = F − P
Water removed due to steam demand ≅ $E_n S$ (see note)*
Water removed in effect #5 due to heat of reaction flashing = $\frac{(1-a)(-\Delta H)}{L_5}$ Water removed in effect #6 due to heat of reaction flashing = $\frac{a(-\Delta H)}{L_6}$ Water removed in effect #6 due to condensation of reaction heat flashed in effect #5 = $\frac{(1-a)(-\Delta H)}{L_6}$ Thus:

$$F - P \cong E_n S + \frac{(1-a)(-\Delta H)}{L_5} + \frac{a(-\Delta H)}{L_6} + \frac{(1-a)(-\Delta H)}{L_6}$$

Or:

$$S = \frac{F - P}{E_n} - \frac{1}{E_n}(\frac{(-\Delta H)}{L_6} + \frac{(1-a)(-\Delta H)}{L_5})$$

Note that the assumption that the water removed due to evaporator steam demand = $E_n S$ is not strictly correct because a disproportionate amount of steam is required to heat the liquor to the boiling point in passing from effect to effect.

Table I summarizes the foregoing analysis of the known art. Note that the evaporator steam requirement is lowered when BLOX systems are installed in a mill with direct contact evaporation. However, this reduction in steam demand is insufficient to make up for the loss in heating value of the black liquor. Therefore, the net result is that existing BLOX systems cause a net loss in available steam.

TABLE I

| | Effect of BLOX on Net Steam Production For Known Art Mills | | | | |
|---|---|---|---|---|---|
| | Mill Before BLOX | Air BLOX | a = 1 | Oxygen BLOX a = 0.5 | a = 0 |
| Weak Black Liquor Flow | | | | | |
| LB/ADT | 20,000 | 20,000 | 20,000 | 20,000 | 20,000 |
| K/MT | 10,000 | 10,000 | 10,000 | 10,000 | 10,000 |
| Weak Black Liquor Concentration % | 15 | 15 | 15 | 15 | 15 |
| Concentration Entering Direct Contact Evaporator % | 50 | 50* | 50* | 50* | 50* |
| Black Liquor Na$_2$S Loading | | | | | |
| LB/ADT | 180 | 180 | 180 | 180 | 180 |
| (K/MT) | (90) | (90) | (90) | (90) | (90) |
| Total Water Removed | | | | | |
| LB/ADT | 14,000 | 14,000 | 14,000 | 14,000 | 14,000 |
| (K/MT) | (7,000) | (7,000) | (7,000) | (7,000) | (7,000) |
| Latent Heat of Vaporization | | | | | |
| BTU/LB H$_2$O | 1,000 | 1,000 | 1,000 | 1,000 | 1,000 |
| (Kc/K) | (554.3) | (554.3) | (554.3) | (554.3) | (554.3) |
| BLOX Efficiency % | | 99 | 99 | 99 | 99 |
| BLOX Heat of Reaction MM BTU/ADT | | −0.495** | −0.495** | −0.495** | −0.495** |

TABLE I-continued

Effect of BLOX on Net Steam Production
For Known Art Mills

| | Mill Before BLOX | Air BLOX | a = 1 | Oxygen BLOX a = 0.5 | a = 0 |
|---|---|---|---|---|---|
| (Kc/MT) | | $(-1.37 \times 10^5)$ | $(-1.37 \times 10^5)$ | $(-1.37 \times 10^5)$ | $(-1.37 \times 10^5)$ |
| Evaporator Steam Required. | | | | | |
| MM BTU/ADT | 2.800 | 2.701 | 2.701 | 2.651 | 2.602 |
| (Kc/MT) | $(7.76 \times 10^5)$ | $(7.49 \times 10^5)$ | $(7.49 \times 10^5)$ | $(7.35 \times 10^5)$ | $(7.21 \times 10^5)$ |
| Recovery Boiler Steam Production | | | | | |
| MM BTU/ADT | 13.100 | 12.600*** | 12.600*** | 12.600*** | 12.600*** |
| (Kc/MT) | $(3.63 \times 10^6)$ | $(3.49 \times 10^6)$ | $(3.49 \times 10^6)$ | $(3.49 \times 10^6)$ | $(3.49 \times 10^6)$ |
| Net Steam Available for Process | | | | | |
| MM BTU/ADT | 10.300 | 9.899 | 9.899 | 9.949 | 9.998 |
| (Kc/MT) | $(2.86 \times 10^6)$ | $(2.74 \times 10^6)$ | $(2.74 \times 10^6)$ | $(2.76 \times 10^6)$ | $(2.77 \times 10^6)$ |

ADT = Air dried ton (of pulp)
K/MT = Kilograms per metric ton of pulp (airdry basis)
Kc/K = Kg. cal./Kg.
Kc/MT = Kilogram calories per metric ton of pulp (airdry basis)
*Not corrected for $Na_2S_2O_3$ formation Reaction: - 2780
**Heat of Reaction - 2780 × 180 × .99 × $10^{-6}$ MM BTU/ADT Includes correction for some organic oxidation (see Grace above-cited at page 253)
***Corrected for loss in heating value due to BLOX 13,100 - (2780 × 180 × $10^{-6}$) Correction ≠ heat of reaction because BLOX polishing operation eliminates remaining 1% of ΔH.

Translating these data to a 1000 t/d kraft mill, having a recovery system generating 10,300 MM BTU/day of process steam, air BLOX reduces the available steam by 401 MM BTU/day ($101 \times 10^6$ kilogram calories/day). Assuming that evaporator feed is split equally between effects #5 and #6, prior art oxygen BLOX reduces available steam by 351 MM BTU/day ($88.5 \times 10^6$ kilogram calories/day).

Figure 4:
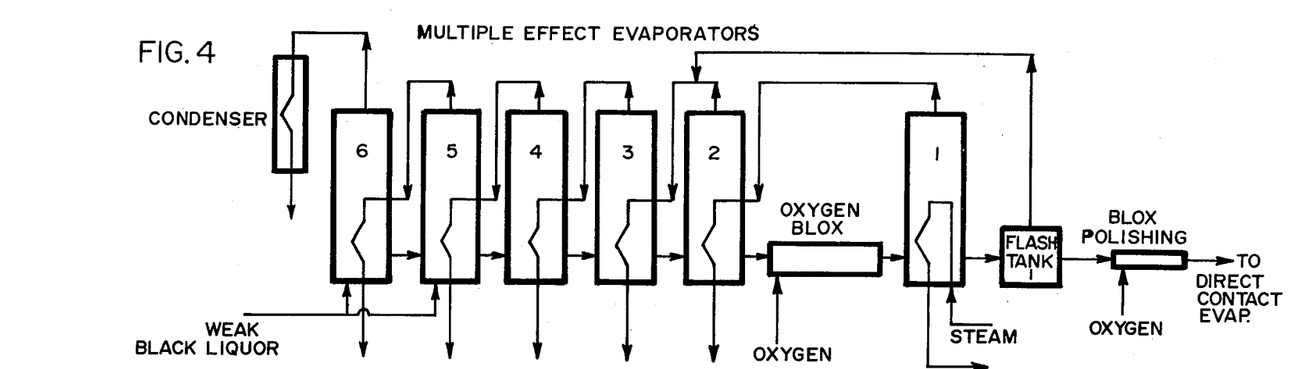
FIGS. 4, 5 and 6 are schematic flow diagrams of alternative systems in accordance with the present invention, wherein the oxidation reaction is integrated into the multiple effect evaporation facility.

In the embodiment of the present invention as illustrated by the flow diagram of FIG. 4, the oxidation reactor is placed in line between effect #1 and effect #2 of the multiple effect evaporator sequence. As shown, the weak black liquor admitted may be split between evaporator #6 and evaporator #5. The initial steam coil heating is applied as heretofore explained in connection with the known operations depicted in FIGS. 2 and 3, the evolved vapor overhead, as before, passing from one lower to the next higher of the evaporator effects in ascending numerical order. From effect #2 the residual liquor enters the oxidation reactor where it is oxidized with high purity oxygen gas. The oxidized liquor is then sent to the first effect evaporator (#1) for heating by contact with the steam coil therein and the liquid therefrom discharged into a flash tank, followed by BLOX polishing before being sent to the direct contact evaporator.

In the process as shown by the flow diagram of FIG. 4, only one flash tank is employed, placed intermediate to the #1 evaporator effect and the BLOX polishing unit. The embodiment illustrated in FIG. 5 utilizes two flash tanks in series. In the FIG. 5 embodiment, the oxygen reactor is placed in line of liquid flow between the #1 evaporator effect of the multiple effect sequence and the next adjacent flash tank (#2). The residual liquid thus flows sequentially from the first effect evaporator to the oxidation reactor and the oxidized liquor then flows into the #2 flash tank. The vapor overhead from the #2 flash tank is sent by conduit to indirect heat exchange in the #2 evaporator effect, these vapors being previously joined by the vapor discharged from the #1 effect evaporator. From the #2 flash tank the unvaporized liquid portion passes into flash tank #1, the vapor overhead from that tank joining the vapors discharged from #2 evaporator enroute to the heat exchange coil in #3 evaporator. As before, the liquid discharged from #1 flash tank is sent to BLOX polishing and thence to the direct contact evaporator.

Figure 5:
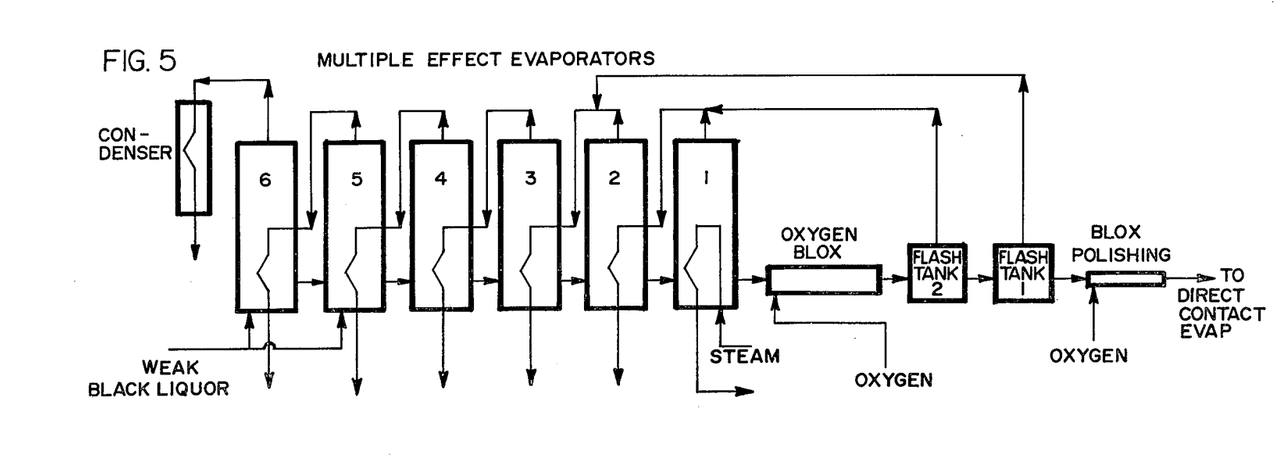
Figure 6:
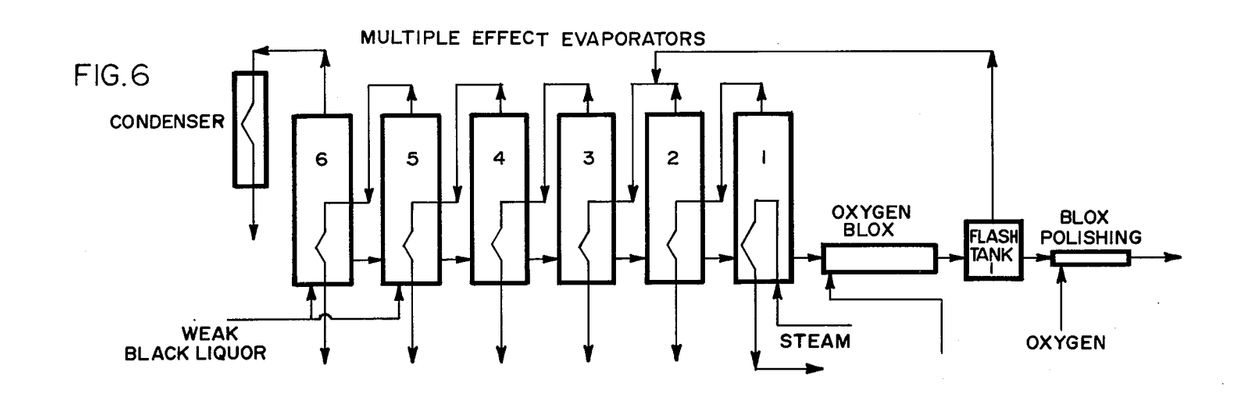

The embodiment of FIG. 6 uses the same location of the oxygen BLOX reactor as that in FIG. 5, but employs a single flash tank following the oxidation reaction. In this embodiment, the vapor overhead, as shown, from the flash tank is joined to the vapor overhead from #2 evaporator effect and the both vapors are used in heating the liquid in effect #3.

In each of these embodiments according to the invention and as is illustrated in FIGS. 4 through 6, the BLOX reaction is incorporated into the multiple effect evaporator system in such manner as to allow recovery of the heat of reaction to replace a portion of the evaporator steam requirement. In operation of either the alternative embodiments illustrated in FIGS. 4 and 5, virtually all of the heat of reaction can be recovered. In both these cases, the net effect is to convert the heat of reaction to steam which supplements the vapor leaving the first effect of evaporation. Thus:

$$F - P = E_n(L_s S + (-\Delta H))$$
$$\text{or} \quad S = \frac{F - P}{E_n} - \frac{(-\Delta H)}{L_s}$$

which is clearly more efficient recovery of high value energy than is possible by the hitherto known systems of the prior art.

In the method illustrated by the alternative modification of FIG. 6, using a single flash tank, the efficiency does not equal that obtained by the methods of FIGS. 4 and 5, but even operation according to FIG. 6 provides a higher efficiency than that obtained by the known methods of the prior art. The following analysis gives a reasonable approximation of steam demand when operation is conducted by the FIG. 6 embodiment.

| | |
|---|---|
| Total water removed | $= F - P$ |
| Water removed due to steam demand | $= E_n S$ |
| Evaporation in Flash Tank due to heat of reaction | $= \frac{-\Delta H}{L}$ |
| Evaporation in effects 3, 4, 5, 6 due to condensation of reaction heat flashed in F.T. (number of effects influenced × evaporation per effect) | $\approx \frac{4 \times E_n}{6} \frac{(-\Delta H)}{L}$ |

Thus $F - P = E_n S + (\frac{4E_n}{6} + 1)\frac{(-\Delta H)}{L}$

-continued $$S \cong \frac{F-P}{E_n} - \left(\frac{4}{6} + \frac{1}{E_n}\right)\frac{(-\Delta H)}{L}$$

which is still more efficient than the known art but not as efficient as the system of FIGS. 4 and 5.

The liquid from condensation in each of the multiple effect evaporators may be individually discharged or combined for discharge through a common manifold.

In Table II below, the analysis of the process following the embodiments illustrated in FIGS. 4, 5 and 6 respectively is summarized. It will be noted that in each instance, according to the invention, a reduction in evaporator steam demand is achieved nearly equal to the loss in black liquor heating value. Thus, the net available steam is nearly identical to that generated by a mill without BLOX.

handle the additional flash vapors resulting from the heat of the oxidation reaction.

Any of the various known types of closed oxidation reactors may be employed in practice of the invention. Also, the operating conditions for the oxidation reaction may be such as are known for BLOX processes employing oxygen gas of high concentration (see e.g. Cooper et al, cited above). The operating pressure, of course, must be high enough to prevent flashing within the reactor. Specific conditions that may be employed in operation in accordance with the FIG. 4 embodiment, are as follows:

| | | |
|---|---|---|
| Reactor inlet temperature | 225° F. | (107.22° C.) |
| Reactor outlet temperature | 300° F. | (148.89° C.) |
| Boiling point rise | 7° F. | (3.89° C.) |
| Equilibrium steam temperature | 293° F. | (145° C.) |
| Pressure to prevent flashing | 46 psig | (3.22 kg/cm$^2$) |

TABLE II

EFFECT OF BLOX ON NET STEAM PRODUCTION
FOR MILLS USING THE PROCESS OF THIS INVENTION

| | | OXYGEN BLOX Between Effect #1 and Flash Tank | | |
|---|---|---|---|---|
| | Mill Before BLOX | Between Effects 1 & 2 (Fig. 4) | 2 Flash Tanks (Fig. 5) | 1 Flash Tank (Fig. 6) |
| Weak Black Liquor Flow | | | | |
| LB/ADT | 20,000 | 20,000 | 20,000 | 20,000 |
| K/MT | 10,000 | 10,000 | 10,000 | 10,000 |
| Weak Black Liquor Concentration % | 15 | 15 | 15 | 15 |
| Concentration Entering Direct Contact Evaporator % | 50 | 50 | 50 | 50 |
| Black Liquor Na$_2$S Loading | | | | |
| LB/ADT | 180 | 180 | 180 | 180 |
| (K/MT) | (90) | (90) | (90) | (90) |
| Total Water Removed | | | | |
| LD/ADT | 14,000 | 14,000 | 14,000 | 14,000 |
| (K/MT) | (7,000) | (7,000) | (7,000) | (7,000) |
| Latent Heat of Vaporization | | | | |
| BTU/LB H$_2$O | 1,000 | 1,000 | 1,000 | 1,000 |
| Kc/K | (554.3) | (554.3) | (554.3) | (554.3) |
| BLOX Efficiency % | | 98 | 98 | 98 |
| BLOX Heat of Reaction | | | | |
| MM BTU/ADT | | −0.495 | −0.495 | −0.495 |
| (Kc/MT) | | (136 × 10$^3$) | (136 × 10$^3$) | (136 × 10$^3$) |
| Evaporator Steam Required | | | | |
| MM BTU/ADT | 2.800 | 2.310 | 2.310 | 2.375 |
| (Kc/MT) | (7.76 × 10$^5$) | (6.40 × 10$^5$) | (6.40 × 10$^5$) | (6.58 × 10$^5$) |
| Recovery Boiler Steam Production | | | | |
| MM BTU/ADT | 13.100 | 12.600 | 12.600 | 12.600 |
| (Kc/MT) | (3.63 × 10$^6$) | (3.49 × 10$^6$) | (3.49 × 10$^6$) | (3.49 × 10$^6$) |
| Net Steam Available for Process | | | | |
| MM BTU/ADT | 10.300 | 10.290 | 10290 | 10.225 |
| (Kc/MT) | (2.86 × 10$^6$) | (2.85 × 10$^6$) | (2.85 × 10$^6$) | (2.83 × 10$^6$) |

In the practice of the invention, any type of multiple effect evaporator line may be employed as commonly used by the pulp industry. In designing a new mill, however, the heat transfer surface of the first effect can be reduced, as will be seen from Example 2 below. The evaporators should be capable of bringing a black liquor feed of normally about 15% solids concentration to a 50% product concentration.

In the embodiment of FIG. 5, the vapor line should be connected to the vapor space of evaporator effect #1 for maximum efficiency. Pressure must be maintained equal to the pressure in effect #1 by providing a throttling (pressure control) valve between flash tank #1 and flash tank #2. The flash tanks employed in the embodiments of FIGS. 4 and 5 are identical in design to those commonly employed to step down evaporator product. In operation of the FIG. 6 embodiment, however, the flash tank must be designed for a higher capacity to

| | |
|---|---|
| Reactor pressure must exceed | 46 psig |
| Residence time in reactor | 1 second to 5 minutes |

An example of conditions applicable in operation of the FIG. 5 embodiment is as follows:

| | | |
|---|---|---|
| Reactor inlet temperature | 252° F. | (122.22° C.) |
| Reactor outlet temperature | 360° F. | (182.22° C.) |
| Boiling point rise | 11° F. | (6.11 ° C.) |
| Equilibrium steam temperature | 349° F. | (176.11° C.) |
| Pressure to prevent flashing | 119 psig | |
| Reactor pressure must exceed | 119 psig | |
| Residence time in reactor | 1 second to 5 minutes | |

In operating the FIG. 5 embodiment, throttling valves will be required to step down products of the BLOX reactor and a feed pump must be used to pressurize the reactor.

Stated more generally, BLOX utilizing the system of FIG. 4 may be operated at temperatures in the range of 200° to 340° F. (93° to 170° C.) and pressures of 45 to 100 psig. Somewhat higher pressures and temperatures are generally indicated for BLOX in the systems of FIGS. 5 and 6, as 225° to 400° F. (105° to 205° C.) and pressures in the range of 50 to 200 psig (4.4 to 14.6 atmospheres).

Pressure in the BLOX reactor should be maintained above the equilibrium partial pressure of the black liquor in the reaction zone. Operation below such pressure will cause flashing or vaporization within the reactor and consequent loss in reactor efficiency. The temperature should be maintained as high as possible for maximum reaction rates. Temperatures in excess of about 400° F. (205° C.) may cause excessive organic oxidation and thus be wasteful of oxygen. Sufficient retention time must be allowed for the sulfide oxidation reaction to take place to substantial completion. It has been indicated that a retention time of 1 second to 5 minutes will obtain 98% conversion of a strong black liquor. Of course, no harmful effects are had by extending the residence time.

To obtain complete oxidation according to stoichiometry, a mole of oxygen is required for each mole of sulfur, so that the oxygen requirement per weight amount of $Na_2S$ is 32/78 or 0.41 times the weight of the sulfide. In normal operation it is preferred to employ oxygen in 20-40% excess, i.e. in the range of 0.49 to 0.57 times the weight of sodium sulfide. Too much oxygen of course if wasteful.

While a polishing reactor is shown in the several figures of the drawings, it will be understood that the same is optional and becomes necessary only when the remaining sulfide concentrations in the black liquor requires such additional oxidation treatment because of possible reversion or incomplete oxidation in earlier stages of oxidation of the liquor. If needed or desired, any of the known types of polishing reactors may be employed.

For best results in practice of the invention oxygen gas of high purity should be employed in the BLOX reactor, preferably as of no less than 95% $O_2$, the rest of the gas being composed of nitrogen, argon or other inert gases.

In the following examples certain of the advantages obtained in operating in accordance with the invention are set out. Example I analyzes the net reduction in available steam after BLOX installation in a typical kraft pulp mill, utilizing the system depicted in FIG. 4. Example II analyzes the reduction in heat transfer surface required in the first effect, when using the FIG. 4 process as compared with the FIG. 5 process. Example III demonstrates that practice of the present invention allows increased evaporator capacity and consequently increased pulp production.

EXAMPLE I

A 1000 ton/day (907 metric tons/day) kraft pulp mill having direct contact evaporation, installs oxygen black liquor oxidation using the process shown in FIG. 4.

Before Installation of the BLOX

Evaporator steam economy = 5
Weak black liquor solids = 15%
Solids in feed to direct contact evaporator 50%
Weak black liquor flow 20 MM lbs/day ($9.027 \times 10^6$ Kg/day)
$Na_2S$ in black liquor 180 M lbs/day (81,648 Kg/day)
Evaporator steam 2800 MM BTU/day ($7.056 \times 10^8$ kg. cal/day)
Steam produced in recovery boiler 13,100 MM BTU/day ($3.3 \times 10^9$ kg. cal/day)
Net Process steam production 10,300 MM BTU/day ($2.60 \times 10^9$ kg. cal/day)

After Installation of BLOX

Weak black liquor solids 15%
Solids in direct contact evaporator feed 50% (uncorrected for $Na_2S_2O_3$)
Efficiency of 1st BLOX reactor 98%
$Na_2S$ after evaporation 3.6 M lbs/day (1633 kg/day)
$Na_2S$ after 2nd BLOX reactor Nil
$O_2$ required (40% excess $O_2$) 103 M lbs/day (46,721 kg/day)
Evaporator steam 2310 MM BTU/day ($5.82 \times 10^8$ kg. cal/day)
Steam produced in recovery boiler 12,600 MM BTU/day ($3.175 \times 10^9$ Kg. cal/day)
Net process steam production 10,290 MM BTU/day ($2.59 \times 10^9$ Kg. cal/day)
Net reduction in available steam 10 MM BTU/day ($2.52 \times 10^6$ Kg. cal/day)
Energy to operate $O_2$ generator 120 MM BTU/day ($3.02 \times 10^7$ kg. cal/day)

EXAMPLE II

The use of this invention reduces the heat transfer surface which is required in the first effect of evaporation. A 1000 T/d kraft pulp mill having the same operating characteristics as in Example I has the first effect heat transfer surface requirements as follows:

1000 t/d mill without BLOX

| | |
|---|---|
| Solids in feed to direct contact evaporator | 50% |
| Boiling point rise in flash tank | 13° F. (7.22° C.) |
| Liquor temperature in flash tank | 231° F. (110.56° C.) |
| Solids in feed to flash tank | 49.3% |
| Boiling point rise in Effect #1 | 13° F. (7.22° C.) |
| Liquor temperature in Effect # 1 | 252° F. (122.22° C.) |
| Steam temperature (35 psig) | 281° F. (138.33° C.) |
| Heat transfer surface in Effect #1 | 20,000 SQFT (1858 sq. meters) |
| Steam demand | 2800 MMBTU/day ($7.06 \times 10^8$ Kg. cal/day) |
| 1000 t/d mill using process of Fig. 4. | |
| Steam demand | 2310 MMBTU/day ($5.82 \times 10^8$ kg. cal/day) |
| Heat transfer surface required = $\frac{20000 \times 2310}{2800}$ = | 16,500 SQFT (1533 sq. meters) |

Heat transfer surface of other evaporation effects not changed.

1000 t/d mill using process of FIG. 5

| | |
|---|---|
| Solids in feed to direct contact evaporator | 50% (uncorrected) |
| Boiling point rise in flash tank #2 | 13° C. (7.22° C.) |
| Liquor temperature in flash tank #2 | 231° F. (110.56° C.) |
| Solids in feed to flash tank #2 | 49.3% |
| Boiling point rise in flash tank #1 | 13° F. (7.22° C.) |
| Vapor temperature in flash tank #1 | 239° F. (115° C.) |
| Liquor temperature in flash tank #1 | 252° F. (122.22° C.) |
| Water removed in flash tank #1 = $\frac{(-\Delta H)}{L_{ft}}$ = | |

-continued $$= \frac{2780 \times 180 \times 1000 \times .98}{951}$$

= 0.516 MM lbs/day (2.34 × 10⁵ kg/day)

| | |
|---|---|
| Solids in feed to flash tank #1 | 45.4% |
| Boiling point rise in Effect #1 | 11° F. (6.11° C.) |
| Vapor temperature in Effect #1 | 239° F. (115° C.) |
| Temperature in Effect #1 | 250° F. (121.11° C.) |
| Steam temperature (35 psig) | 281° F. (138.33° C.) |
| Steam demand | 2310 MM BTU/day |
| | (5.82 × 10⁸ kg. cal./day) |
| Heat transfer surface required = $2000 \times \frac{2310}{2800} \times \frac{(281-252)}{281-250}$ = | |
| | 15,500 sq ft (1440 sq meters) |

Heat transfer surface of other evaporation effects not changed.

EXAMPLE III

The use of this invention allows increased evaporator capacity up to a practical limit which will differ for individual mills. If pulp mill production is limited by the evaporator capacity, as is frequently true, this invention permits increased pulp production to be achieved. The theoretical upper limit to pulp production resulting from this invention is shown below for the mill of Example I.

1000 t/d mill without BLOX

All operating conditions identical to those in Examples I and II.

Theoretical Maximum Pulp Mill Capacity using Process of FIG. 4

| | |
|---|---|
| Heat transfer capability of Effect #1 | 2800 MM BTU/day |
| | (7.06 × 10⁸ kg. cal/day) |
| Heat transfer actually used at 100 t/d | 2310 MM BTU/day |
| | (5.82 × 10⁸ kg. cal/day) |
| Potential capacity $1000 \times \frac{2800}{2310}$ | t pulp/day |
| | (1100 metric tons) |
| O₂ required at 1000 t/d | 103 M lbs/day |
| | (46,721 Kg/day) |
| O₂ required at 1212 t/d | 125 M lbs/day |
| | (56,700 kg/day) |

Practical limitations such as entrainment, heat transfer capacity of effects #2, 3, 4 etc, and vapor handling capacity of the evaporators will likely limit the pulp mill capacity to somewhat less than 1212 t/d (1100 metric tons/day).

Theoretical Maximum Pulp Mill Capacity Using Process of FIG. 5

| | |
|---|---|
| Heat transfer capability of effect #1 resulting from | |
| lower boiling point = $2800 \times \frac{(281-250)}{281-252}$ = | 2990 MM BTU/day |
| | (7.53 × 10⁸ Kg.cal./day) |
| Heat transfer actually used at 1000 t/d = | 2310 MM BTU/day |
| | (5.82 × 10⁸ kg. cal./day) |
| Potential capacity $1000 \times \frac{2990}{2310}$ | = 1295 t pulp/day |
| | (1175 metric tons/day) |
| O₂ required at 1000 t/d | = 103 M lbs/day |
| | (46,721 kg/day) |
| O₂ required at 1295 t/d | = 133 M lbs/day |
| | (60,329 kg/day) |

As before, practical limitations will limit the pulp mill capacity to less than 1295 t/day (1175 metric tons/day).

While the preferred locations of the BLOX reactor integrated into the evaporator system are as hereinbefore specifically described and illustrated in FIGS. 4 to 6, it will be apparent that certain other possible locations are within the scope of the invention and would provide a higher energy efficiency than that of previous known systems. The following additional locations are suggested:

1. Location of the BLOX reactor between evaporator effects #1 and #2 and employing a single flash tank, so that the vapors discharged from such tank are added to the vapors leaving effect #1.

2. Location of the BLOX reactor between effects #2 and #3, or between #3 and #4, etc., providing that the heat of reaction is used to supplement the vapors leaving an evaporation effect operated at higher pressure than the feed effect.

3. Conducting BLOX in two or more reactors which are located in any combination of the above locations and in some instances even applied to the yet weak black liquor. This arrangement could have the advantage of removing a bottleneck in an existing mill if a particular evaporator effect exhibits poor heat transfer. Moreover, an arrangement using two BLOX stages, with the first stage between effects #2 and #1 and the second stage between effect #1 and the flash tanks, would attain energy recovery equal to that obtained in the designated preferred embodiments of the invention.

By the practice of the present invention the following advantages are achieved:

1. High recovery—as up to about 100%—of the energy which is otherwise wasted in prior known BLOX systems.

2. Increase in potential pulp production as a result of increased evaporator capacity under appropriate circumstances.

3. Reduction in reversion incident to the high temperatures employed in the BLOX reaction; see papers by Bart et al and Christie, cited above.

4. Reduction in heatng surface requirement in the first evaporation effect.

While the invention has been particularly described with respect to its application to pulp mill recovery systems, the principles thereof could be applicable to any chemical process having an exothermic reaction and in which evaporation is employed as part of the processing sequence.

What is claimed is:

1. In the oxidation of black liquor obtained from wood pulping with sulfur-containing compounds in a system employing multiple effect evaporation for concentration of such liquor, the improvement which comprises utilizing the heat evolved in the oxidation reaction to reduce the external heat requirement for evaporation of the black liquor supplied to such evaporation, such reduction in external heat requirement being effected by (a) subjecting the total sulfur content of the black liquor introduced to said multiple effect evaporation to such oxidation, (b) employing oxygen gas of high O₂ concentration for said oxidation, and (c) conducting the oxidation at superatmospheric pressure during a stage of black liquor flow through the multiple effect evaporation or immediately subsequent to the final evaporation stage in the direction of liquor flow through said multiple effect evaporation; flashing the oxidized liquor from said final evaporating stage and returning the flashed vapors to the multiple effect evaporation to augment heating in at least one effect by combining the flashed vapors with vapors leaving an evaporation effect located upstream of the oxidation stage in the direction of black liquor flow, said evaporation effect being operated at higher pressure than that of the effect into which the black liquor is first introduced.

2. The improvement as defined in claim 1 wherein at least a portion of the flashed vapors are utilized in effect #3 of the multiple effect evaporation, numbered in a direction counter to that of black liquor flow.

3. The improvement as defined in claim 2 wherein the said oxidation is conducted immediately subsequent to the final evaporation stage, the said flashing is effected in two separate stages and the vapors from said second stage are utilized to augment heat supplied to said effect #3.

4. The improvement as defined in claim 3 wherein the vapors flashed in the first stage are utilized to augment heating in effect #2.

5. The improvement as defined in claim 2 wherein the vapors obtained in flashing of the oxidized black liquor are joined to the evolved vapors passing from effect #2 to effect #3.

6. The improvement as defined in claim 3 wherein the vapors from the first stage flashing of the oxidized black liquor are joined to the evolved vapors passing from effect #1 to effect #2, and the vapors from the second stage flashing of the oxidized black liquor are joined to the evolved vapors passing from effect #2 to effect #3.

7. The improvement as defined in claim 1 wherein said oxidation of the black liquor is effected at a stage during flow of the liquor from one to another effect of the multiple effect evaporation.

8. The improvement as defined in claim 1 wherein said oxidation of the black liquor is carried out at a stage in its flow between the next to the last and the last effect in liquid flow direction through a reverse flow multiple effect evaporator system.

9. The improvement as defined in claim 8 wherein the oxidized liquid is subjected to further evaporative concentration in said last effect and the vapors thus evolved in said last effect are employed in providing heat to an immediately preceding effect, the liquid remaining in said last effect being flashed and the flashed vapors supplied to join the evolved vapors passing from the next to last effect to the immediately preceding effect in direction of liquid flow.

10. The improvement as defined in claim 1 wherein said oxidation of the black liquor is carried out at a stage in its flow following the last effect in liquid flow direction through a reverse flow multiple effect evaporation system, the oxidized liquor being thereafter flashed and at least part of the flashed vapors are added to the evolved vapors passing from the next to last evaporating stage to the one immediately preceding the next to last in the direction of liquid flow.

11. The improvement as defined in claim 10 wherein the flashing of the oxidized liquor is carried out in two consecutive stages, flashed vapors from the first such flashing stage being utilized to augment heating in the next to last evaporating stage in the direction of liquid flow and the vapors from the second such flashing stage being utilized to augment heating in the evaporating stage preceding the next to last evaporating stage in the direction of liquid flow.

12. The improvement as defined in claim 11 wherein the oxidation of the black liquor is carried out at a temperature in the range of 225° to 400° F. and at a pressure sufficient to prevent flashing of the black liquor within the oxidizer.

13. The improvement as defined in claim 1 wherein the oxidation of the black liquor is carried out with an oxygen gas of at least 95% $O_2$ content.

* * * * *

UNITED STATES PATENT AND TRADEMARK OFFICE
CERTIFICATE OF CORRECTION

PATENT NO. : 4,239,589
DATED : 16 December 1980
INVENTOR(S) : Edward F. Elton, Andrew J. Patrylak & Joseph G. Santangelo It is certified that error appears in the above-identified patent and that said Letters Patent are hereby corrected as shown below:

In the Specification

Column 8 between lines 41 and 42 the equation shown as: "$F-P = E_n(L_s S+(-\Delta H))$" should read:

$$-- F-P = E_n \left( S + \frac{(-\Delta H)}{L_s} \right) --$$

Signed and Sealed this

Twenty-fourth Day of November 1981

[SEAL]

Attest:

Attesting Officer

GERALD J. MOSSINGHOFF

Commissioner of Patents and Trademarks